United States Patent [19]
Rossomme

[11] 3,750,229
[45] Aug. 7, 1973

[54] APPARATUS FOR CLEANING CURED SPONGE RUBBER EXTRUSION

[75] Inventor: Paul L. Rossomme, Logansport, Ind.

[73] Assignee: The General Tire & Rubber Company, Akron, Ohio

[22] Filed: Mar. 29, 1971

[21] Appl. No.: 129,024

[52] U.S. Cl................ 15/304, 15/306 A, 15/316 R
[51] Int. Cl................................................ A47l 5/38
[58] Field of Search..................... 18/12 TB, 12 TT, 18/14 A; 15/306 A, 316 A, 307, 308, 302, 304, 310; 68/240

[56] References Cited
UNITED STATES PATENTS

| | | | |
|---|---|---|---|
| 2,724,907 | 11/1955 | Walter .......................... | 15/306 A X |
| 2,729,536 | 1/1956 | Pull et al.......................... | 15/308 X |
| 2,956,300 | 10/1960 | Bruno .............................. | 15/306 A |
| 2,962,747 | 12/1960 | Ford ................................. | 15/306 A |
| 2,984,398 | 5/1961 | Chalmers....................... | 15/306 A X |

Primary Examiner—John Petrakes
Assistant Examiner—C. K. Moore
Attorney—Frank C. Rote, Jr. and Denbigh S. Matthews

[57] ABSTRACT

This invention concerns a method and apparatus for cleaning cured sponge rubber extrusions of varying cross sections and geometry especially having undercuts therein while not upsetting the normal shrink characteristics of the extrusion. The method is practiced by opening the undercut under near frictionless conditions and passing the exposed surface thereof over a low friction, air lubricated surface so that the lubricating air film impinges the surface to remove the adhered particles.

8 Claims, 4 Drawing Figures

APPARATUS FOR CLEANING CURED SPONGE RUBBER EXTRUSION

BACKGROUND OF THE INVENTION

1. Field of the Invention

This invention concerns the treatment of extruded polymeric products. More particularly, this invention concerns cleaning processes for undercut portions of cured extruded sponge rubber products.

2. Description of the Prior Art

Many spong rubber extrusions are in the form of gaskets and welts for positioning about the periphery of various enclosures such as automobile trunk and door openings. Generally speaking, these extrusions comprise curable rubber compounds such as styrene-butadiene (SBR) rubber in association with various fillers, extender oils, reinforcing blacks, curatives, blowing agents, etc., that are extruded through a nozzle into various cross sectional shapes and sizes. Many times these extrusions contain undercuts or folds that are later slipped over anchoring ledges about the periphery of the opening. The blowing agent incorporated in the compound is either activated at the extrusion nozzle or during subsequent curing of the rubber so as to form the product into a relatively thick walled spongy material. The spongy nature of the material improves its cushioning effect as a gasket.

There are many methods by which sponge rubber extrusions are cured such as by psssing them through hot air ovens, steam ovens, etc. One of the more advanced forms of curing processes is known as a Ballotini bed that generally comprises a bed of particles of finely divided solid material disposed adjacent the outlet of the extrusion nozzle and contains the means for fluidizing and heating the bed as well as means for conveying the continuously extruded material through the bed. The bed is fluidizied by upwardly passing hot air or steam, etc. and transfers large quantities of heat through the particles into the extrusion to activate the curing system and crosslink the rubber. The particles comprising the bed are generally small particles of about the size of ordinary sand granules; Ballotini machines are generally described in U.S. Pat. No. 3,072,968 and are further described in Rubber World, October, (1962), pages 82–85, both of which are incorporated by reference herein. After curing, the sponge rubber extrusion is passed to a cooling tank and then onto a variety of process stages depending upon the final end use of the material such as abrasive resistant coating dips, adhesive dips, flocking processes, coloring or painting processes, hole-punching processes, etc.

In this art of making sponge rubber extrusions there is a peculiar problem in that as the extrusion ages it undergoes a linear shrinkage of up to 4 percent or more. This shrinkage may occur mostly within one hour of the curing step or more slowly from up to one week or more after the curing step depending upon various handling techniques of the cured material. It is extremely troublesome to deal with a product having this sort of property because it is difficult to determine the exact length in which to cut the gasket for fitting around an enclosure; quite obviously, if the extrusion shrinks after it is put into place, about say a trunk lid of an automobile, the gap formed at the junction point will permit an influx of rain water and dirt and other unwanted materials into the trunk. This problem has been generally dealt with by keeping the extrusion under a slight but consistent tension; if the tension is slight enough and held rather constant, it has been found that over 90 percent of the shrinkage will occur within the first 24 hours after curing so as to allow for more exact cutting of the extruded material.

More difficulty has occurred, however, in the shrinkage problem when the cured extrusion is to undergo the subsequent processes hereinbefore described such as dipping, flocking, and painting. Although these processes in and of themselves do not interfere with the shrinkage, it has been found that the slightest unbalanced tension placed on the extrusion such as by grasping or touching it with one's finger or by having it touch or brush against a solid surface considerably upsets the normal shrinkage rate and causes the shrinkage to delay thereby throwing the cutting process out of accurate control. This localized tensioning frequently occurs when the cured extrusion leaves the Ballotini bed and is handled and brushed to remove adhering particles of dirt and Ballotini. Of course, without removing this foreign matter, subsequent processes such as dipping, coating, and painting are seriously hampered and the overall effect of these coating processes is greatly deteriorated. Although much of the cleaning may be accomplished by directing an air blast against the exposed surface of the extrusion without encountering shrinkage variations, such a process is not desirable to clear or clean the surfaces of undercuts and folds since a nozzle or other air blasting device will scrape the sides or edges of the extrusion undercut causing not only a change in the shrinkage rate but an overall deformation of the linearity of the extruded product.

This invention concerns a method and apparatus for cleaning these extruded sponge rubber products, especially the undercuts and folds thereof, without altering normal shrinking rates or otherwise adversely affecting the product. The method involves the use of a low friction surface that is lubricated with a fast moving thin film of compressible fluid such as air to partially open the undercut and simultaneously blast off the particles and other adhering matter from the exposed surface and then allowing the undercut to reclose under normal elastomeric contraction. The apparatus of this invention comprises a substantially smooth work surface that is lubricated with a film of rapidly moving compressible fluid and has associated elements to open or partially open the undercut and to urge the exposed undercut surface into close relationship with the film of rapidly moving fluid for the removal of the particles.

Therefore, the main object of this invention is a method of cleaning sponge rubber extrusions for subsequent processing and to enhance overall product quality. Other objects include a method of cleaning an extrusion that does not adversely affect the shrinkage rate of any part thereof; a method of preparing cured sponge rubber extrusions for subsequent processing without the need for handling or otherwise deleteriously handling the extrusion so that the normal shrinkage rate of the cured material is unaffected and an apparatus for continually cleaning sponge rubber extrusions to obtain not only a better product but to obtain a product that does not exhibit localized adverse shrinkage; and an apparatus for continually cleaning a variety of extruded sponge rubber configurations.

SUMMARY OF THE INVENTION

This invention concerns a method and apparatus for removing adhered particles of matter from the surface of undercuts in cured rubber sponge extrusions, the apparatus comprising in combination a platform having a low-friction surface to continuously receive an extrusion containing an undercut, the leading edge of the platform shaped to partially open the undercut during passage of the extrusion thereacross, the leading end of the platform forming a substantially smooth work surface of a shape and working dimension, transverse to the axis of extrusion travel, substantially equal to the shape and cross-sectional periphery of the partially opened undercut for receiving the exposed surface of the undercut in spaced apart relationship, a film of rapidly moving compressible fluid formed over the work surface and the leading edge to maintain the extrusion therefrom in spaced apart relationship and to impinge the surface of the undercut to remove adhered matter therefrom, means for forming the film over the work surface and the leading edge, and means for urging the opened undercut against the platform.

DESCRIPTION OF THE PREFERRED EMBODIMENT

This invention contemplates sponge rubber extrusions of all types as exemplified hereinbefore. The term "rubber" not only includes both natural rubber and synthetic rubbers such as acrylic rubbers, butadienestyrene rubbers, chloroprene rubbers, chlorosulfonated polyethylene rubbers, fluorocarbon rubbers, isobutyleneisoprene rubbers, isoprene rubber, butadiene rubber, nitrile-butadiene rubber, polyisobutylene rubber, polysulphide rubber, silicone rubber, and urethane rubber, but includes these aforementioned rubbers in combination with various plastics such as thermosetting resins; for instance, alkyd resins, epoxy resins, phenolics, polyamides, and polyester resins, and thermoplastic resins such as acrylonitrile-butadiene-styrene (ABS) resins, acetal resins, acrylics, amino resins, cellulosics, fluorocarbons, polystyrene, polycarbonate, polyolefins, and various mixtures thereof. These rubbers and rubber blends are mixed with a variety of compounding ingredients that are generally well-known in the art so that further elucidation is not required.

Figure 1:
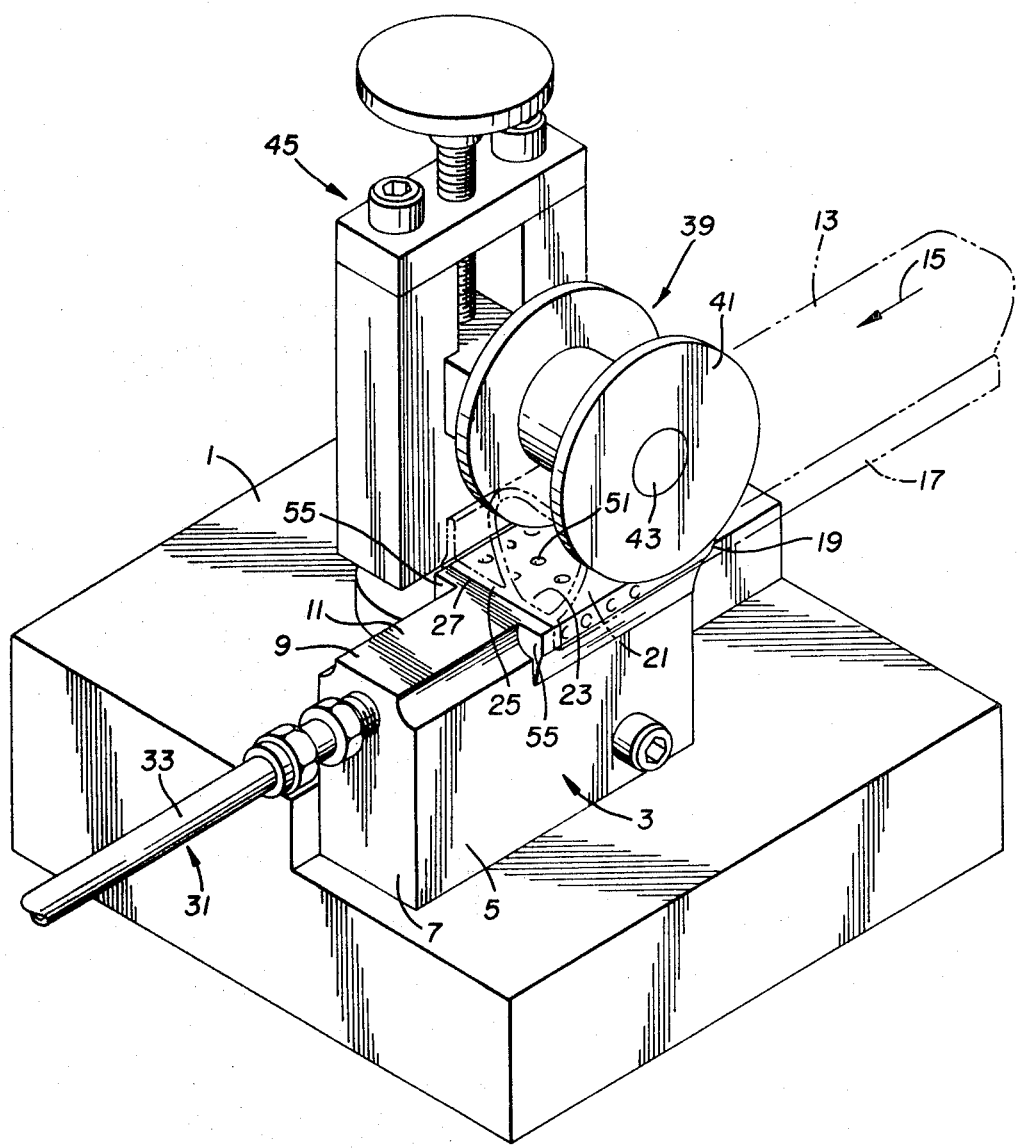
FIG. 1 is an isometric view of one embodiment of the apparatus of this invention showing the passage of a sponge rubber extrusion across the working surface thereof.

Referring now to the figures wherein like elements are identified with like numerals throughout the three figures, FIG. 1 shows in isometric view one embodiment of the apparatus of this invention. In the Figure is shown a base 1 whereupon is mounted a shoe 3 in the general configuration of a rectangular block enclosed by side walls 5 and end walls 7 and topped by platform 9. Platform 9 contains a low friction surface 11, generally formed by a slippery coating such as polytetrafluoroethylene, sold under the trademark Teflon or other low friction material for continuously receiving extrusion 13 (shown in dotted outline) that is passing in the direction of arrow 15 or from right to left across platform 9. Extrusion 13 contains undercut 17 that is positioned underneath thereof and partially hidden from view.

Platform 9 forms leading edge 19 which first contacts and partially opens undercut 17 during passage of extrusion 13 thereacross. Leading edge 19 may be of a variety of shapes, however, as is better shown in FIGS. 2a and 2b, it may comprise merely a straight edge having slightly rounded corners. Leading end 21 of platform 9, or the end first contacted by extrusion 13 after passage across leading edge 19, forms a work surface 23 which is a substantially smooth surface of a shape and working dimension (hereinafter defined) that is substantially equal to the shape and cross section periphery of partially opened undercut 17 of extrusion 13 and receives exposed surface 25 of undercut 17 in spaced apart albeit close relationship. Leading end 21 of platform 9 is merely that portion of the platform that first contacts extrusion 13 whereas work surface 23 encompasses leading end 21 and the upper portion of the side walls 5.

The term "working dimension" is that portion of work surface 23 (and side walls 5) in contact with exposed surface 25 of undercut 17 as shown in FIG. 1. This working dimension is taken transverse to the axis of travel of extrusion 13 and is substantially equal in shape and overall length to the shape and cross sectional periphery of exposed surface 25.

Working dimension also includes the surface of outwardly directed protrusions 55 that may be placed along the sides of leading end 21 of platform 9; these protrusions, over which film 27 of fluid is directed, are adapted to catch exposed surface 25 along the edges of undercut 17 to aid in holding undercut 17 in spaced apart relationship from but close to work surface 23.

Depending upon the initial size and shape of undercut 17, work surface 23 and platform 9 may be in a configuration other than the substantially flat embodiment shown in FIG. 1 and may be in a configuration such as a semicylinder or in an inverted U-shape. The intent of work surface 23 is to receive the exposed surface 25 of partially opened undercut 17 in close but not contact relationship.

Over the entire extent of work surface 23 is a thin film of rapidly moving compressible fluid 27. This fluid film is formed by means 31 which generally comprises a compressible fluid source (not shown), delivery tube 33 and either manifold system 35 (FIG. 2a) or porous block surface 37 (FIG. 2b). The compressible fluid, preferably air; however, other possibilities include steam, nitrogen, carbon dioxide, etc., is formed into film 27 over work surface 23 and leading edge 19 to maintain exposed surface 25 of extrusion undercut 17 in spaced apart relationship from work surface 23 and leading edge 19 and to impinge upon exposed surface 25 to dislodge and remove adhered matter therefrom. By maintaining exposed surface 25 and extrusion 13 in spaced apart relationship from platform 9, there is no localized tension placed upon extrusion 13, or undercut 17, to alter the general shrinkage characteristics of the extrusion so that the extrusion will be cleaned without change in its normal shrink rate hence allowing it to be cut into controlled lengths for later use. The position of undercut 17 over the entire working surface of platform 9 aids in trapping the compressible fluid so as to maintain a constant film of rapidly moving, highly lubricative compressible fluid over work surface 23. By combining this lubrication aspect with the impinging and cleaning characteristics of the film compressible fluid, the normally difficult to clean undercut 17 is easily and completely cleaned in preparation for subsequent processes of dipping, flocking, painting, etc.

Positioned over platform 9 and in contact with extrusion 13 is means 39 for urging extrusion 13 and undercut 17 against platform 9. In the embodiment shown in FIG. 1 means 39 comprises idler roll 41 freely turning on shaft 43 which shaft is mounted in adjustment means 45 which is further mounted on base 1. Idler roll 41 is of a configuration so as to contact a broad area of extrusion 13 to reduce as much as possible the amount of local tension per unit area applied by it to extrusion so as to minimize the change in shrinkage characteristics. Means 39 may also comprise a second fluid blast position over extrusion 13 to combine the means for urging the undercut against platform 9 with a cleaning operation over the exposed surface of extrusion 13. In addition, adjustment means 45 may be of a different embodiment than shown in FIG. 1 such as a rack and pinion adjustment means or some other such type.

Figure 3:
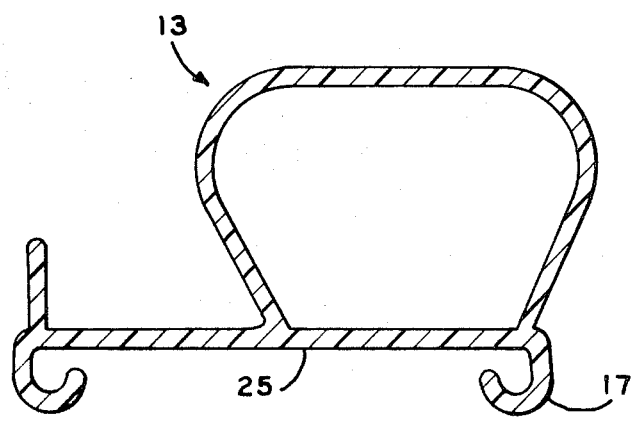
FIG. 3 is a cross section view of the extruded strip showing the normal configuration of the undercut.

In operation, extrusion 13 is fed onto work surface 23 so that leading edge 19 gently but firmly opens undercut 17 to place exposed surface 25 in spaced apart albeit close relationship to platform 9, means 39 is brought in gentle contact with the exposed surface of extrusion 13 to aid in urging exposed surface 25 into close relationship to work surface 23 and means 31 is activated to deliver compressible fluid to the surface of work surface 23 to form a uniform film of rapidly moving compressible fluid thereover to maintain undercut 17 in spaced apart relationship from work surface 23 and in addition to impinge exposed surface 25 to dislodge and remove adhered matter therefrom. Extrusion 13 with cleaned exposed surface 25 thereafter continues along platform 9 and, when removed therefrom, undercut 17 elastically retracts to its normal configuration as shown in FIG. 3 so that the cleaned extrusion may be passed to the next processing step.

Figure 2A:
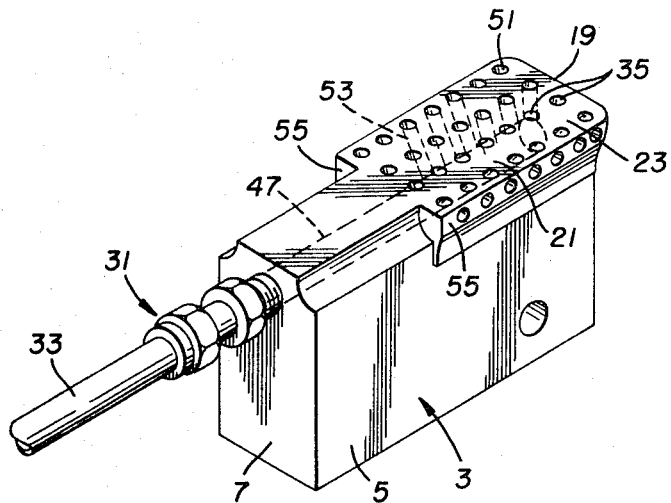
FIGS. 2a and 2b show different embodiments of the platform portion of the apparatus of this invention and different means for forming the film of rapidly moving compressible fluid over the work surface thereof.
Figure 2B:
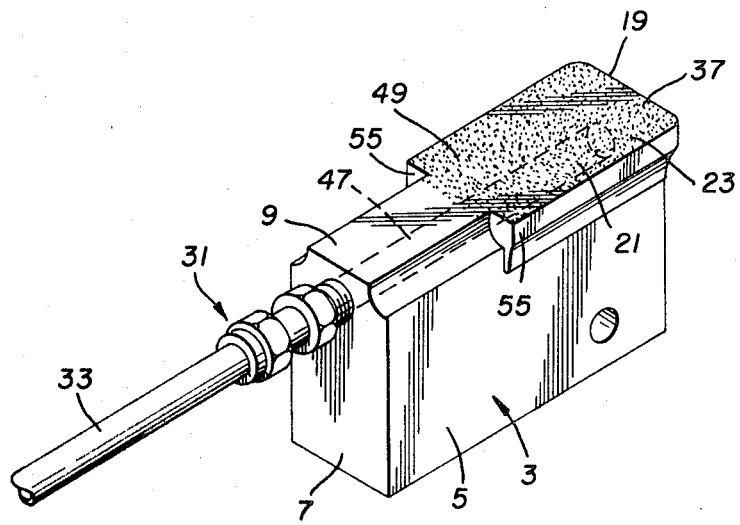

FIG. 2a shows the embodiment of shoe 3 as shown in FIG. 1 wherein means 31 comprises fluid delivery tube 33 emptying into bore 47 which permits fluid to pass through manifold system 35 which comprises holes 51 and transfer tubes 53. In this embodiment shoe 3 may be formed from metal or other material and coated on work surface 23 with a low friction coating such as Teflon, polypropylene, or other low friction material or shoe 3 may be cut from a block of solid low-friction material such as Teflon since the extrusion 13 does not contact shoe 3 and thus neither is subjected to extreme wear.

FIG. 2b shows a separate embodiment of shoe 3 wherein means 31 comprises fluid delivery tube 33 emptying into bore 47 which permits fluid to seep therefrom into porous mass 49 that forms the material shown in shaded lines topped by work surface 23. Porous mass 49 may be cut from a block of sintered metal particles and coated thereover with a low friction porous release coating such as sintered Teflon.

What is claimed is:

1. Apparatus for removing adhered matter from the surface of undercuts in cured rubber sponge extrusions comprising in combination:

a. a platform having a low-friction surface to continuously receive an extrusion containing an undercut;
b. the leading edge of said platform shaped to partially open said undercut during passage of said extrusion thereacross;
c. the leading end of said platform forming a substantially smooth work surface of a shape and working dimension, transverse to the axis of extrusion travel, substantially equal to the shape and cross-sectional dimension of said partially opened undercut for receiving the exposed surface of said undercut in spaced apart relationship;
d. means, acting in cooperation with said extrusion, for forming a film of rapidly moving compressible fluid over said work surface and said leading edge to maintain said extrusion therefrom in spaced apart relationship and to impinge said surface of said undercut to dislodge and remove adhered matter therefrom, said means including a longitudinal bore under said platform and a porous mass in communication therewith forming said work surface;
e. means for urging said opened undercut against said platform.

2. The apparatus of claim 1 wherein said low-friction surface comprises polytetrafluoroethylene.

3. The apparatus of claim 1 wherein said work surface is substantially flat.

4. The apparatus of claim 1 wherein said fluid is air.

5. The apparatus of claim 1 wherein said means for forming said film over said work surface comprises an elongated bore under said platform and a system of manifold leads connectong said bore with said work surface.

6. The apparatus of claim 1 wherein said means for urging said open undercut against said platform comprises an idler roller positioned opposite said work surface and in contact with said moving extrusion.

7. The apparatus of claim 1 wherein said means for urging said open undercut against said platform includes means for adjusting the position of said urging means with respect to said moving extrusion.

8. Apparatus for removing adhered matter from the surface of undercuts in cured rubber sponge extrusions comprising in combination:

a. a platform having a low-friction surface to continuously receive an extrusion containing an undercut;
b. the leading edge of said platform shaped to partially open said undercut during passage of said extrusion thereacross;
c. the leading end of said platform forming a substantially smooth work surface of a shape and working dimension, transverse to the axis of extrusion travel, substantially equal to the shape and cross-sectional dimension of said partially opened undercut for receiving the exposed surface of said undercut in spaced apart relationship;
d. means, acting in cooperation with said extrusion, for forming a film of rapidly moving compressible fluid over said work surface and said leading edge to maintain said extrusion therefrom, said means forming a work surface comprising a generally horizontal surface and at least one generally vertical surface, said means including a longitudinal bore under said platform, a plurality of air passages in open communication from said bore to said horizontal and vertical surfaces; and
e. means for urging said opened undercut against said platform.

* * * * *